No. 781,825. PATENTED FEB. 7, 1905.
F. W. HEDGELAND.
AUTOMOBILE.
APPLICATION FILED NOV. 10, 1904.
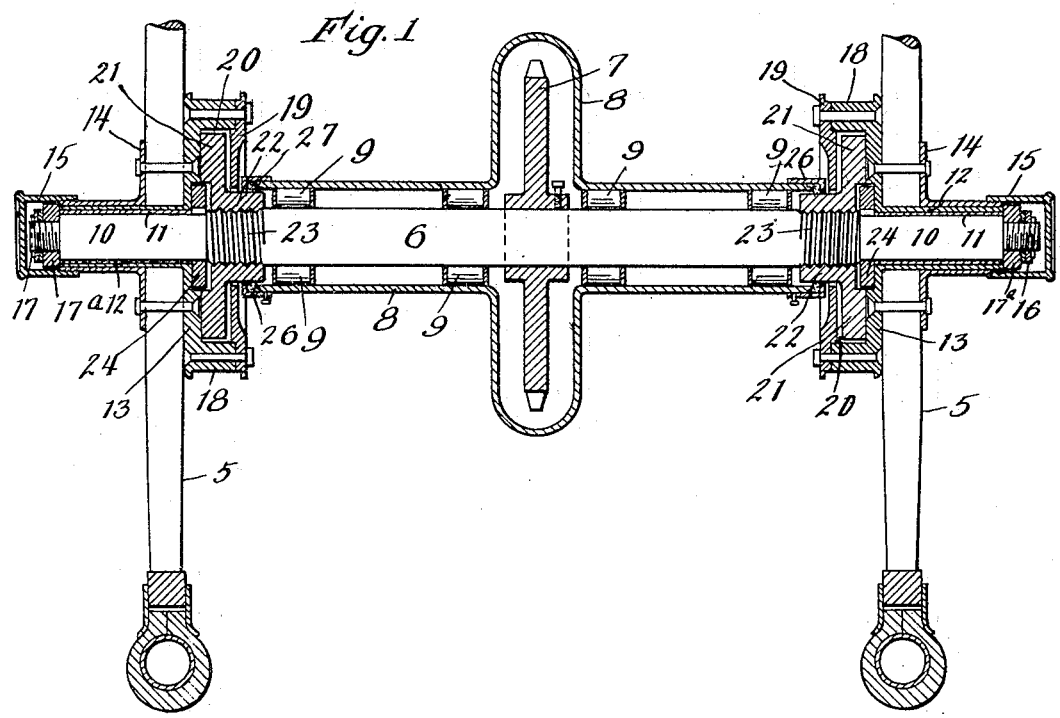
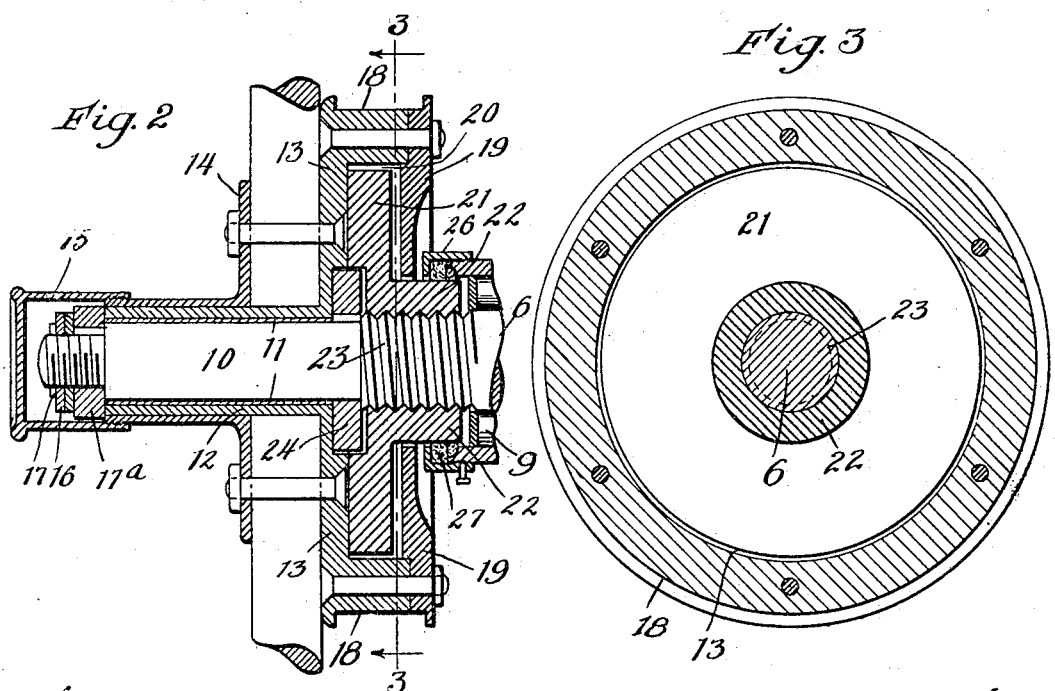
Witnesses:
Wm. Geiger
A. W. Munday
Inventor:
Frederick W. Hedgeland
By Munday, Evarts & Adcock.
Attorneys No. 781,825.

Patented February 7, 1905.

UNITED STATES PATENT OFFICE.

FREDERICK W. HEDGELAND, OF CHICAGO, ILLINOIS.

AUTOMOBILE.

SPECIFICATION forming part of Letters Patent No. 781,825, dated February 7, 1905.

Application filed November 10, 1904. Serial No. 232,067.

*To all whom it may concern:*

Be it known that I, FREDERICK W. HEDGELAND, a citizen of the United States, residing in Chicago, in the county of Cook and State of Illinois, have invented a new and useful Improvement in Automobiles, of which the following is a specification.

The object of this invention is to provide a simple construction whereby to remedy the very undesirable tendency to which all differential-gear automobiles are subject to swerve from the straight line when the steering-wheels are set for a straight-ahead and which is due, as I believe, to the fact that the drive-wheels do not always, even when the machine is moving in a straight line, exert equal driving power. The wheel which takes the greater portion of the burden of propelling the machine is generally the one which is carrying the greater burden or which by reason of the differences in the surfaces over which the two wheels may be moving or the difference in diameter of the two wheels, due to unequal inflation of the tires or other cause, is enabled to exert the greater tractive power. Of course one wheel may be the propelling-wheel one minute and the other wheel the next minute, and the burden may shift from one to the other frequently. With the differential-gear machines it is also true that in rounding a corner or turning a curve the outer wheel does the driving, while the inner one, if it moves at all, runs idle. This peculiarity of its operation imparts a tendency to the machine to turn too far, especially when the pavement is wet or slippery, and the objectionable swerving tendency referred to is apt to be increased when the emergency-brake is put on, because thereby the inactive wheel is often made to move in the reverse direction.

The nature of my improvement, which is wholly automatic in its operation, is fully explained below; and it consists in the novel devices and in the novel combinations of parts and devices hereinafter described.

In the accompanying drawings, forming a part of this specification, Figure 1 is a vertical section in a plane longitudinal of the rear axle. Fig. 2 is an enlarged vertical section of one of the wheels, and Fig. 3 is a section at right angles to and upon the line 3 3 of Fig. 2.

In said drawings, 5 5 are the rear or driven wheels of the automobile, and 6 is the rear driving-axle. The latter is made in one piece and carries the sprocket-wheel 7, by which the power of the motor is transmitted to the axle. A housing 8 incloses the sprocket-wheel and the main portion of the axle and is provided with bearings 9 9 for the axle. The outer ends 10 of the axle are reduced in diameter and inserted in sleeves 11, with freedom to turn therein. The sleeves are in turn fitted in the hubs 12, formed with integral flanges 13, between which flanges and opposing flanges upon sleeves 14 the spokes of the wheels are clamped by bolts, as shown. Sleeves 14 surround and are supported on the outer ends of the hubs 12 and are provided with caps 15, protecting the ends of the axle, and the nuts 16, by which the wheels are held on the axle. The nuts are prevented from coming loose by cotter-pins 17 and interposed washers 17$^a$.

Upon each flange 13 is formed a rim 18, and to this rim is bolted a disk or plate 19, thus forming an inclosed space 20, having friction-surfaces facing each other and surrounding the axle. In this open space I place a friction or clutching device 21, having a flange 22, threaded interiorly and engaging the thread 23 on the axle adjoining the spindle 10. The clutching-ring 21 is adapted to grip the surface of the flange 13 and also the surface of the disk 19, and it is moved from one to the other of these surfaces by the threaded engagement with the axle, and it is shifted from one to the other automatically at each reversal in the direction of the rotation of the axle by reason of the friction exerted upon the flange 22 by the packing 27 or other suitable means. The direction of the motion imparted to the wheel is of course dependent upon the motion of the axle, and the greater the power applied to the axle the stronger will be the friction-grip of the shifting clutching device 21 upon the wheel.

When the machine is turning a corner or curve, the inner wheel will continue to move at the same speed with the axle and will be the driving-wheel, while the outer wheel by its traction upon the ground will run free at a speed exceeding that of the axle. My friction clutch is adapted to permit this result because the outer wheel in such cases readily frees itself from the clutch, the motion of both the axle and wheel being in the same direction and permitting the increased motion of the wheel to effect the release; but the clutching action is resumed immediately upon the wheel slowing down to the speed of the axle. This operation is also wholly automatic.

In the preferred construction a collar 24 is placed upon the axle at the junction of the spindle with the threaded portion 23 and is keyed thereon. It is adapted to take the thrust of the wheel in the inward direction. Both the flange 13 and the clutching device are cut out, as seen at Fig. 2, to give room to this collar, the clutching device not coming in contact with it. The housing 8 at its end adjacent to the wheel is provided with a flanged ring 26 inclosing the flange 22 of the friction device and confining the packing 27, whereby the dirt is excluded from the thread of the friction device.

I have described above the wheel shown at Fig. 2; but it will be understood that the other wheel is constructed in exactly the same way, excepting that the direction of the screw-threaded portion is reversed, thereby adapting the axle to move the friction device in opposite directions at the same time.

The friction on the clutching device necessary to cause its shifting from one of the wheel-surfaces to the other I obtain from the packing 27, which bears on the flanges 22, as plainly shown. Slight friction is sufficient for this purpose, and the packing has proved efficacious in the use I have made of the invention; but it will be understood that I do not wish to be limited to any particular means for exerting this friction.

The invention gives a greatly-increased tractive power, because both wheels are positively driven and the tendency to swerve is overcome.

I claim—

1. The combination with the driving-shaft and the driven member of an automobile, of a clutch actuated longitudinally by the shaft to positively drive the member in either direction, and to permit the driven member to revolve faster than the shaft in either direction.

2. The combination with the driving-shaft and the driven member of an automobile, of a clutch actuated longitudinally by the shaft to positively drive the member by frictional contact in either direction, and to permit the driven member to revolve faster than the shaft in either direction.

3. The combination with the driving-axle and driving-wheel of an automobile, of a shifting friction device, the wheel having two opposite surfaces with either of which the friction device may be brought into contact, and the friction device having a threaded engagement with the axle, so that it is shifted automatically from one to the other of said surfaces at each reversal of the axle.

4. The combination with the driving-axle and driving-wheel of an automobile, of a threaded and automatically-shifted friction device mounted on the axle and extending into an open space formed in the hub of the wheel, the opposite sides of which form gripping-surfaces with which the friction device may engage.

5. The automobile, the wheels whereof are provided with differential gearing, consisting of friction devices threaded on the axle and shifted thereby, and opposite gripping-surfaces at each wheel adapted to be engaged alternately by said friction devices.

6. The combination with a driving-shaft, the driven member mounted on the shaft, and provided with friction-surfaces facing each other, and a shifting clutching device between said surfaces and adapted to engage one of them when the shaft is turned in one direction and the other of them when the shaft is turned in the other direction, said clutching device being shifted by the shaft when it reverses its movement.

7. The combination with a driving-shaft, the driven member mounted on the shaft, and provided with friction-surfaces facing each other, and a clutching device for gripping said surfaces which is shifted from one to the other of them at each reversal of the shaft.

8. The combination with a driving-shaft, the driven member mounted on the shaft, and provided with friction-surfaces facing each other, and a clutching device for gripping said surfaces which is shifted from one to the other of them by the shaft at each reversal of its movement.

9. The combination with a driving-shaft, the driven member mounted on the shaft, and provided with friction-surfaces facing each other, and a device for gripping said surfaces which is threaded on the shaft so as to be shifted from one to the other of said surfaces at each reversal of the shaft.

FREDERICK W. HEDGELAND.

Witnesses:
EDW. S. EVARTS,
H. W. MUNDAY.